Sept. 6, 1949.  R. H. CLAPP ET AL  2,481,200
SILENT CAR WHEEL
Filed Aug. 4, 1945
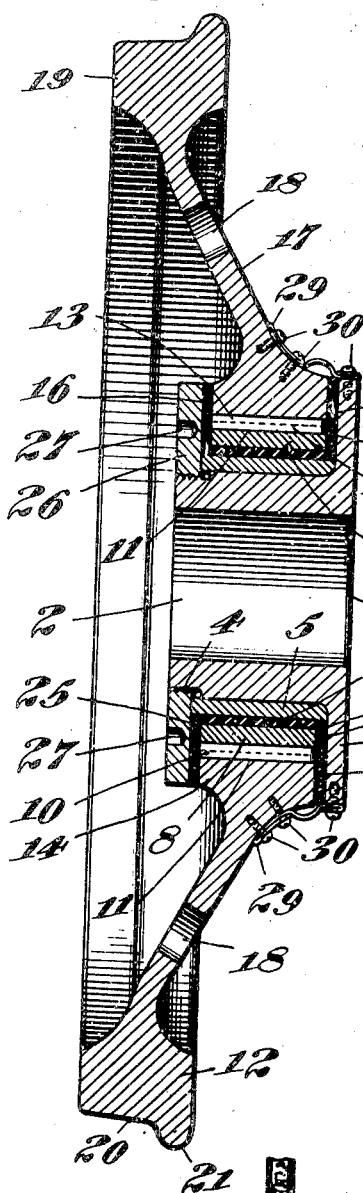
Fig. 1.
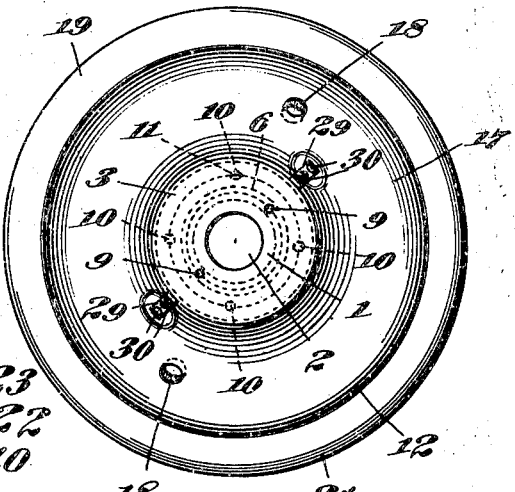
Fig. 2.
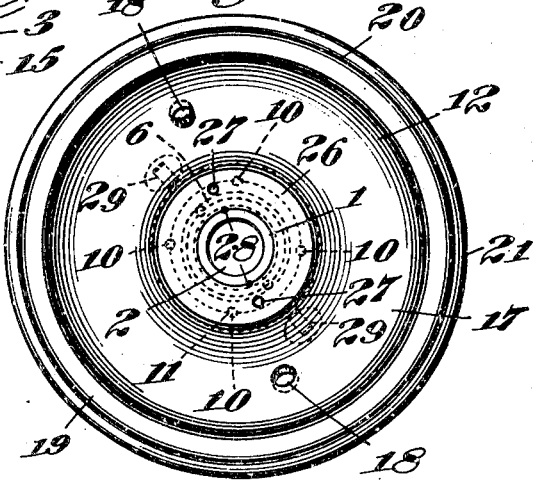
Fig. 3.
Fig. 4.
Inventors
Roger H. Clapp
and John A. Phelan
By R. S. C. Dougherty
Attorney Patented Sept. 6, 1949

2,481,200

UNITED STATES PATENT OFFICE 2,481,200

SILENT CAR WHEEL

Roger H. Clapp, Greenfield, Mass., and John A. Phelan, Jackson Heights, N. Y., assignors to Bethlehem Steel Company, a corporation of Pennsylvania Application August 4, 1945, Serial No. 608,888

4 Claims. (Cl. 295—11)

This invention relates to a noise-silencing wheel for rail vehicle use, and more particularly to a laterally stable noiseless car wheel which is adapted to be braked upon the tread.

Resilient wheels for street railways, elevated lines, subway lines and steam railroads have been worked on more or less experimentally by inventors over a period of years. Such wheels have generally comprised combinations of cast or rolled metal parts with inflated or solid rubber cushions (or sometimes metal springs) to provide resiliency.

While some wheels of this type have been quite successful in reducing vibration and noise, their use has not been general because of a number of well known and characteristic drawbacks. As a class, they have been regarded as possessing a rather poor load-carrying capacity, and a degree of lateral instability which sometimes makes it impossible to keep them on the track. Rapid deterioration of the rubber from the heat generated by the application of conventional shoe brakes to the wheel treads usually makes necessary the added expense of track brakes. Not infrequently the wheels are so different in shape from standard wheels as to require major changes in the design of the trucks and brake rigging, and their particular construction and assembly may also result in other items of complication and expense.

One object of this invention, therefore, is to provide a cushioned car wheel of great load-carrying capacity.

Another object is to provide a car wheel having a pre-compressed elastic element sufficiently removed from the tread area to permit the safe use of shoe brakes.

Another object is to provide a silent car wheel adapted for the replacement of standard wheels with a minimum of changes in auxiliary equipment.

Still another object is to provide a vibration-absorbing wheel which through the elimination of driving lugs and other protruding parts is simpler and less expensive to manufacture and more efficient in operation than conventional wheels.

Other objects, advantages and purposes of the invention will appear hereinafter in the specification and in the claims; and in order to render the same more clear we shall now refer to the attached sheet of drawings forming a part of this specification and in which like characters of reference will designate like parts:

Figure 1 is a vertical transverse section of our improved wheel;

Fig. 2 is a rear elevation of the said wheel;

Fig. 3 is a front elevation of the wheel; and

Fig. 4 is a partial section of one sound-insulating liner.

As shown in the drawings, our improved wheel has an inner driving hub 1, which is substantially a large steel cylinder having a bore 2 adapted to receive one end of a car axle (not shown) in a press fit, and having a large flange 3 on the rear or inside of the wheel and a threaded portion 4 on the front or outside. Similarly pressed onto the driving hub 1, their respective contact surfaces having been first properly lubricated with white lead, is the inner sleeve 5 of the resilient bushing 6. Said resilient bushing 6 comprises said inner sleeve 5, a rubber compression ring 7 vulcanized thereto, and an outer sleeve 8, both of said sleeves 5 and 8 being made of lengths of seamless steel tubing finished all over, and pre-assembled under compressive stress by the method shown, for example, in the United States patents to I. W. Robertson, Nos. 2,008,772 and 2,049,624, issued July 23, 1935, and July 28, 1936, respectively. The inner sleeve 5 as shown is of somewhat greater length than either the compression ring 7 or the outer sleeve 8, to permit of proper seating against the flange 3. The firm pre-compression of the rubber ring 7 between the sleeves tremendously increases its load-carrying capacity, the difference between 150 p. s. i. and 1200 p. s. i. being a measure of the average gain. A pair of holes 9 in the flange 3 will allow the insertion of knock-out pins when removal is desired.

Keyed by the four keys 10 in equally spaced keyways 11 to the outer sleeve 8 is the wheel 12 proper, which in general outline resembles a standard wheel but with the bore 13 and the outer hub 14 of large diameter. Said outer hub 14 is provided with the side shoulders 15 and 16, the plate or web 17 has punched therein a pair of utility holes 18 for assembling and handling, and the rim 19 is provided with the standard tread 20 and flange 21.

Interposed between the flange 3, on one side, and the shoulder 15, outer sleeve 8 and compression ring 7 on the other side, is the annular laminated inner liner 22, comprising the relatively thin and non-resilient molded fabric shim 23 of asbestos or the like, vulcanized or otherwise bonded between the metal backing plates 24. A similar outer liner 25 is placed against the shoulder 16 and the opposite side of the outer sleeve 8 and compression ring 7, and the large annular lock nut 26, having its bore threaded to fit the threads 4 and its outside diameter the same as that of said shoulder 16, is screwed on tightly by means of the two holes 27 provided for spanner wrenches, and spot welded as at 28 to prevent turning.

As electrical conductors to ground, for street cars and the like, two or more bonds 29 of braided copper cable with ends bent back and down and soldered are secured between the flange 3 and the web 17 by the machine screws 30 threaded into suitable tapped holes therein.

It will be readily understood that by our combination of the substantially non-resilient side liners 22 and 25 with the resilient center bushing 6 we have eliminated all tendency to lateral motion along with the noise and vibration. While the use of molded fabric in said liners is definitely preferred, it is also possible to use brake or clutch lining stock or similar materials sandwiched between the liner plates if required.

Although we have hereinabove described our invention in considerable detail, we do not wish to be limited narrowly to the exact and specific particulars disclosed, but may use such substitutes, modifications, or equivalents as are included within the scope and spirit of the invention or pointed out in the appended claims.

Having thus described our invention, what we claim as new and useful and desire to protect by Letters Patent is:

1. In a silent car wheel, the combination of a driving hub bored to receive an axle, said hub being threaded on its outer end and radially flanged on its inner end, a resilient bushing compressed between metal sleeves and encircling said hub, an outer wheel encircling the bushing, a lock nut on the threaded end of the hub, and liners of sound-absorbent material interposed between the outer wheel and the lock nut in direct contact therewith, and the outer wheel and the flange respectively.

2. In a silent car wheel, the combination of a driving hub having an inner end flange and adapted to be mounted on an axle, a resilient bushing mounted on the driving hub, said resilient bushing comprising inner and outer metal sleeves and a body of elastic material compressed therebetween, an outer wheel mounted on said resilient bushing, a lock nut threaded onto the outer end of the driving hub, and non-sound conducting liners disposed at each side of the outer wheel and the outer sleeve and the resilient material, and between said latter members and the flange and lock nut.

3. In a silent car wheel, the combination of an inner hub having an annular end flange, a resilient bushing fitting snugly over the inner hub, an outer wheel portion secured upon the resilient bushing, a lock-nut secured to the inner hub, and side thrust liners of non-resilient fabric bonded between metal plates interposed between the outer wheel portion and the end flange, and between the outer wheel portion and the lock-nut.

4. In a silent car wheel adapted to resist side thrust, the combination of an inner hub having an end flange and adapted to be pressed onto a car axle, an inner sleeve pressed onto said inner hub, a rubber ring bonded to said inner sleeve, an outer sleeve ensuring compression of said rubber ring, an outer wheel portion keyed to said outer sleeve, a locking device secured to said inner hub, and liners of substantially non-resilient material between protective backing plates interposed between the outer wheel portion and the flange and locking device.

ROGER H. CLAPP.
JOHN A. PHELAN.

REFERENCES CITED

The following references are of record in the file of this patent:

UNITED STATES PATENTS

| Number | Name | Date |
| --- | --- | --- |
| 151,543 | Miltimore | June 2, 1874 |
| 1,888,499 | Gunn | Nov. 22, 1932 |
| 2,090,179 | Brownyer | Aug. 17, 1937 |
| 2,124,350 | Hirshfeld | July 19, 1938 |